Figure 1:
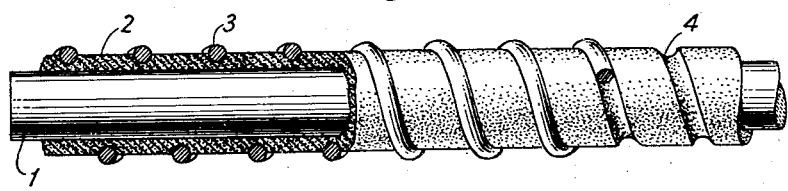

Oct. 4, 1938.  E. FRIEDERICH ET AL  2,131,887

HEATER MANUFACTURE

Filed Feb. 19, 1936

INVENTOR.
ERNEST FRIEDERICH
HERMANN WILHELM KLOSE
BY Charles McClain
ATTORNEY.

Patented Oct. 4, 1938

2,131,887

UNITED STATES PATENT OFFICE 2,131,887

HEATER MANUFACTURE

Ernst Friederich, Berlin-Charlottenburg, and Hermann Wilhelm Klose, Berlin-Reinickendorf, Germany, assignors to Allgemiene Elektricitats Gesellschaft, Berlin, Germany, a corporation of Germany Application February 19, 1936, Serial No. 64,672
In Germany March 2, 1935

1 Claim. (Cl. 25—156)

In the manufacture of indirectly heated cathodes the necessity often arises to place a heater wire spirally about an insulation element or to dispose the wire within a bore of the element. To avoid shifting of the spiral, it has become customary to lock or hold the same in position, for instance, by insulation paste, or to place the heater wire under such a mechanical tension that it will be retained in position. However, arrangements of this kind have not proved successful, since the spiral, because of its frailty, may shift when brought upon the smooth insulation body. According to this invention, an insulator element with a spiral groove is provided, upon which the heater spiral or wire may be inserted or wound. According to this invention, such an insulator body with a spiralled groove is made by interiorly or exteriorly covering the insulator body with an insulation paste, and forming grooves or a spiralled recess in the paste by a removable spiral, hereinafter referred to as the auxiliary spiral.

The invention disclosed may be carried into practice in various forms. An insulation mandrel or core may be externally covered with an insulation paste either by a spray process or by immersion, whereupon an auxiliary spiral with an inside diameter somewhat greater than the outside diameter of the mandrel may be shifted over the mandrel leaving the layer of paste. By turning or twisting, the auxiliary spiral may then be compressed to reduce its diameter in such a way that it will be pressed into the paste to produce spiral grooves. In a similar way the auxiliary spiral may be introduced into a tubular insulation body internally coated with insulation paste to impress in the soft insulation material. If the auxiliary spiral is of elastic metal and is adequately stiff, it may subsequently be removed by a compressing or winding movement. According to a further feature of this invention, the auxiliary spiral could be eliminated by chemical means as, for example, by an acid; or, the auxiliary spiral, if made of organic material, may be removed by vaporization during the baking or burning of the insulator body. If the material used for the auxiliary spiral does not possess strength sufficient for the suggested methods, the groove may conveniently be produced by wrapping on a string or thread in substance such as silk, the latter being later removed by vaporization or burning.

Another procedure would be to first apply the auxiliary spiral and to thereupon apply the insulation paste. In this embodiment of the invention care must be taken so that the interstitial spaces between the turns of the auxiliary spiral will not be filled beyond the maximum diameter of the auxiliary spiral stock so that the auxiliary spiral will not be covered. After a brief preliminary bake, the heater wire may be inserted into the spiral space or cavity formed by the auxiliary spiral. This procedure may be simplified by using an auxiliary spiral having a rectangular cross-section of wire or thread.

Figure 2:
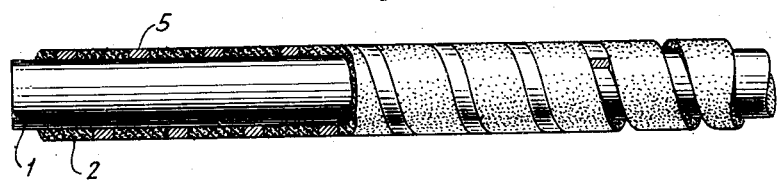
Figure 3:
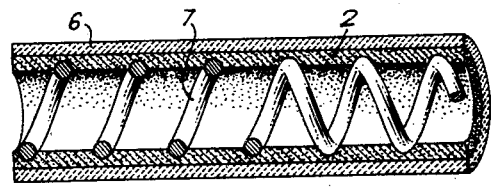

A more complete understanding of this invention may be had by referring to the following specification in connection with the accompanying drawing in which Figures 1 and 2 show embodiments of my invention wherein an insulating body is exteriorly formed with spiral grooves; and Figure 3 shows a further embodiment of this invention in which an insulating tubular member is interiorly grooved.

The refractory insulating rod 1 of Figure 1 is covered, by spraying or immersion, with a coating 2 of refractory inorganic insulating paste such as of ceramic material. Auxiliary spiral 3, preferably of a coil spring formation and of a slightly greater internal diameter than the coated insulator rod, is slipped longitudinally over the coated rod. Opposite ends of the coiled spiral may, in accordance with this invention, be revolved in opposite directions to compress and reduce the diameter of the coil so that its turns sink or embed in the paste coating. The tension of the coiled spiral may then be relieved to move the turns of the coil radially outward, leaving a spiral impression or groove 4 about the cylindrical surface of the pasty insulator. If desired, the paste may be hardened or set, as by heat, before removal of the coil to insure well formed grooves.

According to a further embodiment of this invention, best illustrated in Figure 2, a coiled spiral of such a diameter as to snugly engage the outer surface of insulating rod 1 may be slipped over the rod. In this embodiment of the invention the interstitial spaces between the turns of the coil are filled with insulating paste, care being taken to keep the depth of the paste such that no part thereof will overlie the turns of the coil. As shown in Figure 2, the coil 5 may conveniently be of stock square in cross-section so that upon its removal the edges of the grooves will not be frayed. The insulation may be baked at appropriate temperatures to firmly adhere the insulation paste to the insulating rod before or after the heater wires are placed in the grooves of the insulation.

Figure 3 shows a tubular insulating member 6 internally coated with insulation paste. In this modification spiral coil 7 is inserted in the opening of the tubular insulator and expanded to impress a spiral groove in the coating of insulation. In this embodiment of the invention the ends of the spiral coil will be revolved to expand or increase the diameter of the coil and upon removal thereof the coil will be wound in the opposite direction to decrease its diameter.

To those skilled in the art it will be obvious that many modifications may be made in this invention without departing from the scope thereof. It is accordingly desired that this invention be limited only by prior art and by the appended claim.

We claim:

The method of making solid insulator bodies with a spiral groove to receive a heater wire for indirectly heated cathodes, comprising placing a coiled spiral of vaporizable material around a cylindrical insulating body, placing insulating paste between the turns of said coil of said body, firing the body at a high temperature to simultaneously fuse the paste to the body, remove said coil, and solidify said paste.

ERNEST FRIEDERICH.
HERMANN WILHELM KLOSE.